United States Patent Office 3,425,970
Patented Feb. 4, 1969

3,425,970
SOFT FLOWING AMINOPLAST MOLDING COMPOSITIONS
Nicholas R. Segro, Baltimore, Md., and Eldon L. Hall, Fredericksburg, Va., assignors to FMC Corporation, a corporation of Delaware
No Drawing. Filed June 21, 1966, Ser. No. 559,098
U.S. Cl. 260—17.3                    5 Claims
Int. Cl. C08g 51/40, 51/18, 37/28

ABSTRACT OF THE DISCLOSURE

Aminoplast molding compositions which have improved flow under pressure and improved molding characteristics without loss of cure time are produced by incorporating in said molding composition as a flow promoter from 0.2 to 2 percent of sucrose benzoate.

---

This invention relates to aminoplast molding compositions prepared from synthetic resins of the amino-formaldehyde types, and aims to provide compositions of this general type which have markedly improved flow under pressure, whereby they yield improved molding characteristics without any loss of cure time. In particular, it aims to provide compositions of this sort by the incorporation in the compounds of a small percentage of sucrose benzoate therein.

Aminoplast resins are made by the reaction of amino compounds such as urea, biuret, melamine, ammeline and benzoquanamine with formaldehyde, and are most widely used in the preparation of thermosetting molding compositions. The resins are first reacted to the so-called "B" stage in which they are still soluble and fusible, and are then conventionally blended with fillers, mold lubricants, stabilizers and pigments as desired, together with an acidic material which acts as a curing agent to promote curing of the resin to the insoluble and infusible stage during the molding operation.

One problem that has been encountered with these molding compounds, as with all molding compounds, is the matter of flow under molding conditions. These compositions tend to require too high a pressure to permit molding operations in high-speed automatic molding machines, and there has been considerable effort made to improve these flow properties, by the use of additives for the purpose. Toluene sulfonamides, ethylene glycol, and combinations of alkylated amino resins with the standard molding type have all been suggested for this purpose. However, these flow promoters are deficient in that they either slow up the cure, or very high levels are necessary, with consequent changes in physical properties. There has therefore been a demand for a flow promoter which can be used at lower levels and at the same time will not retard the rate of cure.

We have now discovered that the amino-formaldehyde molding compositions can be made better flowing by the incorporation therein of a minor percentage of sucrose benzoate, to give a marked reduction in the pressure needed to produce flow, with substantially no loss in cure rate.

Improvement is noticed in the flow rate with as little as 0.2% of sucrose benzoate, with very substantial improvement being noted in the range of 0.5 to 1%. When 3% of the material is used, incompatability is observed, with lower gloss in the resultant moldings, so that we prefer not to use more than about 2% of the additive. All of these percentages are based on the total of resin plus filler.

The invention may be practiced with any of the known thermosetting amino-formaldehyde resins, of which urea-formaldehyde and melamine-formaldehyde are the principal commerial examples. These resins are generally made by combining urea, melamine or other amino compound with a molar excess of formaldehyde, the reaction being generally run in water at a somewhat elevated temperature, to produce an aqueous solution of a water soluble reaction product (B stage resin). This B stage resin solution is blended with a reinforcing filler (most generally, alpha-cellulose) in a mixer and then the dried composite is combined with other ingredients and ground in a ball mill to give a blended powder which may be used as such, or which may be densified by compaction and then granulated to give a molding powder of controlled particle size.

In general, the molar ratio of the formaldehyde to the amino compound should be from about 1.15 to 2.00.

While the most commonly used reinforcing filler is shredded alpha-cellulose, other fillers, reinforcing or non-reinforcing, may be used—for example, wood flour, glass fibers and asbestos as reinforcing fillers and clay, talc and the like as non-reinforcing fillers. The resin filler ratio may vary from about 50–50 by weight to about 80–20 by weight, depending on the particular properties desired in the molding compound.

Another ingredient of the composition is generally an internal mold release agent or mold lubricant. Zinc stearate is the most generally used lubricant, but higher fatty acids, their soaps, and related compounds, such as glyceryl monostearate, are also used; the amounts are ordinarily a few tenths of a percent. The particular mold lubricant used is of no consequence in this invention.

Similarly, if it is desired to impart a color to the conposition, pigments may be added. Titanium dioxide is generally added in a small amount to give the product a white look, but color pigments can be added to impart any desired shade to the molding compound. Almost all inorganic pigments can be used, as well as many organics, including the vat pigments, phthalocyanine greens and blues, and the like.

In order to get a satisfactory rate of cure, there is added to the composition a small percentage, generally a few tenths to one percent by weight, of an acid accelerator, generally in conjunction with hexamethylene tetramine which acts to stabilize the composition against premature curing. The hexamethylene tetramine is usually present in amounts from about one-half of, to equal parts by weight with, the accelerator. The accelerators are generally organic acid materials, and are well known in the art. Typical materials are the alkyl toluene sulfonates such as methyl-p-toluenesulfonate and the ethyl-p-toluenesulfonate, and acids such as phthalic anhydride. We have had particularly good results with the halobenzoic acids, o-chlorobenzoic acid, bromobenzoic acid, and 2,4-dichlorobenzoic acid, described in copending application Ser. No. 547,767 filed by N. R. Segro on May 5, 1966. Generally, a few tenths of a percent of accelerator is used in order to get the desired rapid cure.

The following examples are given by way of illustration of the invention, and not by way of limitation thereof.

EXAMPLES A, AND 1 TO 3

600 parts by weight of urea, 908 parts by weight of 44% formaldehyde were combined at 77° F. (mol ratio urea to formaldehyde 1.32) and the pH was adjusted to between 9 and 10 with triethylamine and formic acid. The solution was heated to about 140° F. and held for a period of 20 minutes until the free formaldehyde content was reduced to below 3%. The resin solution thus obtained was mixed with 429 parts by weight of alpha-cellulose in a dough mixer for 15 minutes at 120° F. It was then discharged onto trays, and oven-dried in a controlled atmosphere (190° F. dry bulb temperature, 115° F. wet bulb temperature) until the free moisture content of the dried product was below 1%. The dried resin-treated alpha-cellulose was coarsely ground, using a hammer mill, and combined with the amounts of accelerator and stabilizer and sucrose benzoate indicated in the table, and with the indicated amounts of mold release agent. The mixtures were ground in a mill to a −30 mesh powder and the powder was molded.

The result obtained are disclosed in Table I.

TABLE I
[Resin/Filler=74/26]

| Ex. No. | EPS, percent | HE_A, percent | SB, percent | PHTH, percent | Disc Cure, Secs. | Flow, p.s.i. Powder | Flow, p.s.i. Granular |
|---|---|---|---|---|---|---|---|
| A | 0.40 | 0.2500 | | | 70 | 00770 | |
| 1 | 0.40 | 0.25 | 1.0 | | 70 | 590 | |
| 2 | 0.30 | 0.60 | 1.0 | 0.30 | 65 | 510 | 495 |
| 3 | 0.30 | 0.60 | 0.5 | 0.30 | 65 | 485 | 450 |

All examples include 0.3H zinc sterate. Examples 2 and 3 also contain 0.9— Titanox RA-50 pigment.
EPS—ethyl p-toluenesulfonate.
HE_A—hexamethylenetetramine.
SB—sucrose benzoate.
PHTH—phthalic anhydride.
Disc Cure, Secs.—minimum cure for a 2″ x _″ piece at 300° F. and 6,000 p.s.i.
Flow measured by Olsen-Bakelite Flow tester; p.s.i. required for 1.0″ flow from 0.8 gram molding powder at 300° F.
Granular flow obtained with ball-milled product that has been densified and granulated. gram molding powder at 300° F.
Granular flow obtained with ball-milled product that has been densified and granulated.

It will be noted, comparing Example A and Example 1, that the addition of 1% of sucrose benzoate reduces the necessary mold pressure from 770 p.s.i. to 590 p.s.i., indicating increased flow properties.

When the compositons of Examples 2 and 3 were compacted and granulated, and the materials were used in granular form instead of in the powdered form, the flow rate obtained on Example 2 was 495 p.s.i. and on Example 3 was 450 p.s.i. This indicates that there is essentially no difference between granular flow and powder flow.

EXAMPLES B TO F, AND 4 TO 9

The procedure of the first group of examples was repeated, except that the amount of filler was reduced about a tenth, so that the ratio of resin to filler was 76/24 instead of 74/26.

The results obtained with these various formulations are shown in Table II.

EXAMPLE 10

The procedure used in Examples 1 to 6 was repeated, except the basic urea-formaldehyde resin was made with a molar ratio of formaldehyde to urea of 1.22. The basic resin was combined with alpha-cellulose at a weight ratio of 76 resin to 24 alpha-cellulose (i.e., the same as Examples 7 to 9), and the resin was then compounded by adding 0.5% of ortho-chlorobenzoic acid, 0.3% hexamethylene tetramine, and 0.3% zinc stearate. In accordance with the invention, 1% of sucrose benzoate was added and the product compared with the same product made using no sucrose benzoate. Both moldings showed a disk cure time of 60 seconds, but the flow pressure required was reduced from 1195 p.s.i. in the absence of sucrose benzoate to 767 p.s.i. when sucrose benzoate was added.

EXAMPLE 11

Eight hundred parts by weight of melamine, 863 parts by weight of 44% formaldehyde, and 300 parts by weight of water were mixed and the pH adjusted to 8.4–8.6 with dilute sodium hydroxide and formic acid solutions. The slurry was stirred and heated to 200° F. and held at that temperature for about an hour until the desired degree of condensation was attained, i.e., when a 3 cc. sample of syrup produced a haziness when added to 50° F. water.

The resultant resin syrup was combined in a dough mixer with 460 parts by weight of alpha-cellulose, running the mixer for 20 minutes at 130° F. The mixture was then dried for about one to two hours in a controlled atmosphere, consisting of a forced draft oven at 200° F. dry bulb temperature and at 120° F. wet bulb temperature, to a free moisture content of under 1%. The product was then broken up as in Example 1 and ground in a ball mill with 0.2% ortho-chlorobenzoic acid, 0.1% hexamethylene tetramine, and 0.3% zinc stearate, using 1% sucrose benzoate in one batch and no sucrose benzoate in the other. The material without sucrose ben-

TABLE II
[Resin/=iller½76/24]

| Ex. No. | OCBA, Percent | HEXA, Percent | SB, Percent | MPS, Percent | Disc Cure, Secs. | Flow, p.s.i. Powder | Flow, p.s.i. Granular |
|---|---|---|---|---|---|---|---|
| B | 0.50 | 0.25 | | | Not run | 2,010 | |
| 4 | 0.50 | 0.25 | 0.5 | | Not run | 1,620 | |
| 5 | 0.50 | 0.25 | 1.0 | | Not run | 1,610 | |
| C | | 0.25 | | 0.70 | Not run | 610 | 630 |
| 6 | | 0.25 | 1.0 | 0.70 | Not run | 310 | 335 |
| D | 0.50 | 0.30 | | | 70 | 1,600 | |
| 7 | 0.50 | 0.30 | 1.0 | | 70 | 1,282 | |
| E | 0.50 | 0.20 | | | 55 | 1,977 | |
| 8 | 0.50 | 0.20 | 1.0 | | 55 | 1,410 | |
| F | 0.50 | 0.20 | | | 55 | 1,417 | |
| 9 | 0.50 | 0.20 | 0.5 | | 55 | 1,160 | |

All examples include 0.3% zinc stearate. Examples B to 6 also contain 0.9% Titanox RA-50.
OCBA—ortho-chlorobenzoic acid.
MPS—methyl-p-toluenesulfonate.

zoate required 1657 p.s.i. in the standard flow test as against 1280 for the material with the sucrose benzoate. There was a slight increase in cure time from 70 to 75 seconds.

Quite obviously, the examples can be multiplied indefinitely, without departing from the scope of the invention which is defined in the claims.

We claim:
1. A molding composition consisting essentially of a filled amino-formaldehyde resin containing as a flow promoter from 0.2 to 2% of sucrose benzoate.
2. The composition of claim 1 in which from about 0.5 to 1% of sucrose benzoate is used.
3. The composition of claim 1 in which the resin is a urea-formaldehyde resin.
4. The composition of claim 1 in which the resin is a melamine-formaldehyde resin.
5. The composition of claim 1 in which the filler is alpha-cellulose.

References Cited

UNITED STATES PATENTS 2,223,817  8/1938  Cordier _____ 260—17.3

WILLIAM H. SHORT, *Primary Examiner.*

E. M. WOODBERRY, *Assistant Examiner.*

U.S. Cl. X.R.

260—69, 67.6

PO-1050
(5/69)

UNITED STATES PATENT OFFICE
CERTIFICATE OF CORRECTION

Patent No. 3,425,970    Dated February 4, 1969

Inventor(s) Nicholas R. Segro and Eldon L. Hall

It is certified that error appears in the above-identified patent and that said Letters Patent are hereby corrected as shown below:

Column 3, line 19, before "mill" insert --ball--.
Column 3, lines 26 and 27, (Table I) under "EPS, percent", "0,40", both instances, should be --0.40--.
Column 3, line 24, "HE_A" should be --Hexa--.
Column 3, line 26 "0,2500" should be --0.25--.
Column 3, line 26 "00770" should be --770--.
Column 3, line 24, after "Flow,p.s.i." delete --0--.
Column 3, line 31, "0.3H" should be --0.3%--.
Column 3, line 31, "0.9-" should be --0.9%--.
Column 3, line 34, "HE_A" should be --Hexa--.
Column 3, line 37, "2" x   " should be --2" x 1/8"--.
Column 3, lines 41 and 42 should be deleted.
Column 3, line 45, "compositons" should be --compositions--.
Column 3, line 60, Table II, "[Resin/=iller1/376/24]" should be --(Resin/Filler=76/24)-- .

SIGNED AND
SEALED

MAR 10 1970

(SEAL)
Attest:

Edward M. Fletcher, Jr.
Attesting Officer

WILLIAM E. SCHUYLER, JR.
Commissioner of Patents